(12) United States Patent
Dingle et al.

(10) Patent No.: US 9,662,932 B2
(45) Date of Patent: May 30, 2017

(54) FACE TO HUB CONNECTION FOR A COMPOSITE WHEEL

(71) Applicant: Carbon Revolution Pty Ltd, Waurn Ponds (AU)

(72) Inventors: Matthew Edward Dingle, Torquay (AU); Ashley James Denmead, Belmont (AU); Michael Silcock, Caufield North (AU)

(73) Assignee: Carbon Revolution Pty Ltd., Waurn Ponds, VIC (AU)

( * ) Notice: Subject to any disclaimer, the term of this patent is extended or adjusted under 35 U.S.C. 154(b) by 158 days.

(21) Appl. No.: 14/650,779

(22) PCT Filed: Jun. 17, 2013

(86) PCT No.: PCT/AU2013/000646
§ 371 (c)(1),
(2) Date: Jun. 9, 2015

(87) PCT Pub. No.: WO2014/089598
PCT Pub. Date: Jun. 19, 2014

(65) Prior Publication Data
US 2015/0328922 A1    Nov. 19, 2015

(30) Foreign Application Priority Data
Dec. 10, 2012  (AU) ................................ 2012261712

(51) Int. Cl.
*B60B 1/14* (2006.01)
*B60B 3/00* (2006.01)
(Continued)

(52) U.S. Cl.
CPC ............. *B60B 1/14* (2013.01); *B29C 70/202* (2013.01); *B32B 5/12* (2013.01); *B32B 5/26* (2013.01);
(Continued)

(58) Field of Classification Search
CPC .. B60B 1/14; B60B 3/008; B60B 3/10; B60B 3/004; B60B 5/02; B32B 7/08;
(Continued)

(56) References Cited

U.S. PATENT DOCUMENTS 3,917,352 A * 11/1975 Gageby ................... B29C 70/24
                                                              301/64.702
4,294,490 A * 10/1981 Woelfel .................. B29C 53/60
                                                              301/64.703
(Continued)

FOREIGN PATENT DOCUMENTS

DE          10006400 A1    8/2001
DE    102011077834 A1    12/2012
(Continued)

*Primary Examiner* — S. Joseph Morano
*Assistant Examiner* — Jean Charleston
(74) *Attorney, Agent, or Firm* — Cesari and McKenna, LLP

(57) ABSTRACT

A connection between a face portion (12) and a hub portion (14) of a composite wheel (10). The hub portion (14) comprises a generally disc shaped hub plate (16), and the face portion (12) comprises a plurality of spokes (18). The connection comprises an annular hub ring (22) surrounding the hub plate (16), the hub ring (22) comprising a plurality of layers of reinforcement fibers extending in an at least generally circumferential direction about the hub ring (22). The connection also comprises a first plurality of layers of reinforcing fibers (24) extending in a generally radial direction R relative to an axis of rotation of the wheel (10), and along a front face of each spoke (18), across a front edge (26) and an inner annular surface (28) of the hub ring (22) and across a front face (30) of the hub plate (16); and a second plurality of layers of reinforcing fibers (32) extending in a generally radial direction R along a rear face (33) of each spoke (18), across a rear edge (34) of the hub ring (22) and across a rear face (36) of the hub plate (6). The
(Continued)

connection further comprises a third plurality of layers of reinforcing fibers (36), the third plurality of layers (36) of reinforcing fibers overlaying the first and second (1) layers of reinforcing fibers (24, 32), the third plurality of layers of reinforcing fibers 36 extending in a direction between +30 degrees and +60 degrees to the radial direction R; and a fourth plurality of layers of reinforcing fibers (40), the fourth plurality of layers of reinforcing fibers (40) overlaying the first and second layers of reinforcing fibers (24, (32), the fourth plurality of layers of reinforcing fibers (40) extending in a direction (20) between −30 degrees and −60 degrees to the radial direction R.

23 Claims, 2 Drawing Sheets

(51) Int. Cl.
| | | |
|---|---|---|
| *B60B 3/10* | (2006.01) | |
| *B32B 5/12* | (2006.01) | |
| *B60B 5/02* | (2006.01) | |
| *B29C 70/20* | (2006.01) | |
| *B32B 5/26* | (2006.01) | |
| *B32B 7/08* | (2006.01) | |

(52) U.S. Cl.
CPC .............. *B32B 7/08* (2013.01); *B60B 3/004* (2013.01); *B60B 3/008* (2013.01); *B60B 3/10* (2013.01); *B60B 5/02* (2013.01); *B32B 2260/023* (2013.01); *B32B 2260/046* (2013.01); *B32B 2262/106* (2013.01); *B32B 2605/00* (2013.01); *B32B 2605/08* (2013.01); *B32B 2605/18* (2013.01); *B60B 3/007* (2013.01); *B60B 2310/242* (2013.01); *B60B 2360/341* (2013.01); *B60B 2360/3416* (2013.01); *B60B 2360/362* (2013.01); *B60B 2360/366* (2013.01); *B60B 2900/111* (2013.01); *B60B 2900/113* (2013.01); *B60B 2900/212* (2013.01); *B60B 2900/311* (2013.01); *B60B 2900/711* (2013.01); *Y10T 156/10* (2015.01)

(58) Field of Classification Search
CPC ....... B32B 5/26; B32B 5/12; B32B 2260/046; B32B 2262/106; B32B 2605/18; B29C 70/202
USPC ............ 301/64.101, 64.102, 64.107, 64.202, 301/64.301; 29/894.3, 894.32, 894.35, 29/894.325, 894, 894.321, 341
See application file for complete search history.

(56) References Cited

U.S. PATENT DOCUMENTS

| | | | |
|---|---|---|---|
| 4,514,013 A | * | 4/1985 | Woelfel .................. B29C 53/60 301/64.703 |
| 4,573,745 A | | 3/1986 | Fujisaki et al. |
| 4,721,342 A | * | 1/1988 | Daniels ................. B29C 70/081 301/64.703 |
| 7,361,296 B2 | | 4/2008 | Adrian |
| 2010/0019564 A1 | * | 1/2010 | Theuer .................. B29C 70/347 301/64.703 |

FOREIGN PATENT DOCUMENTS

| | | |
|---|---|---|
| WO | WO 93/01930 | 2/1993 |
| WO | WO 98/12059 A1 | 3/1998 |

* cited by examiner

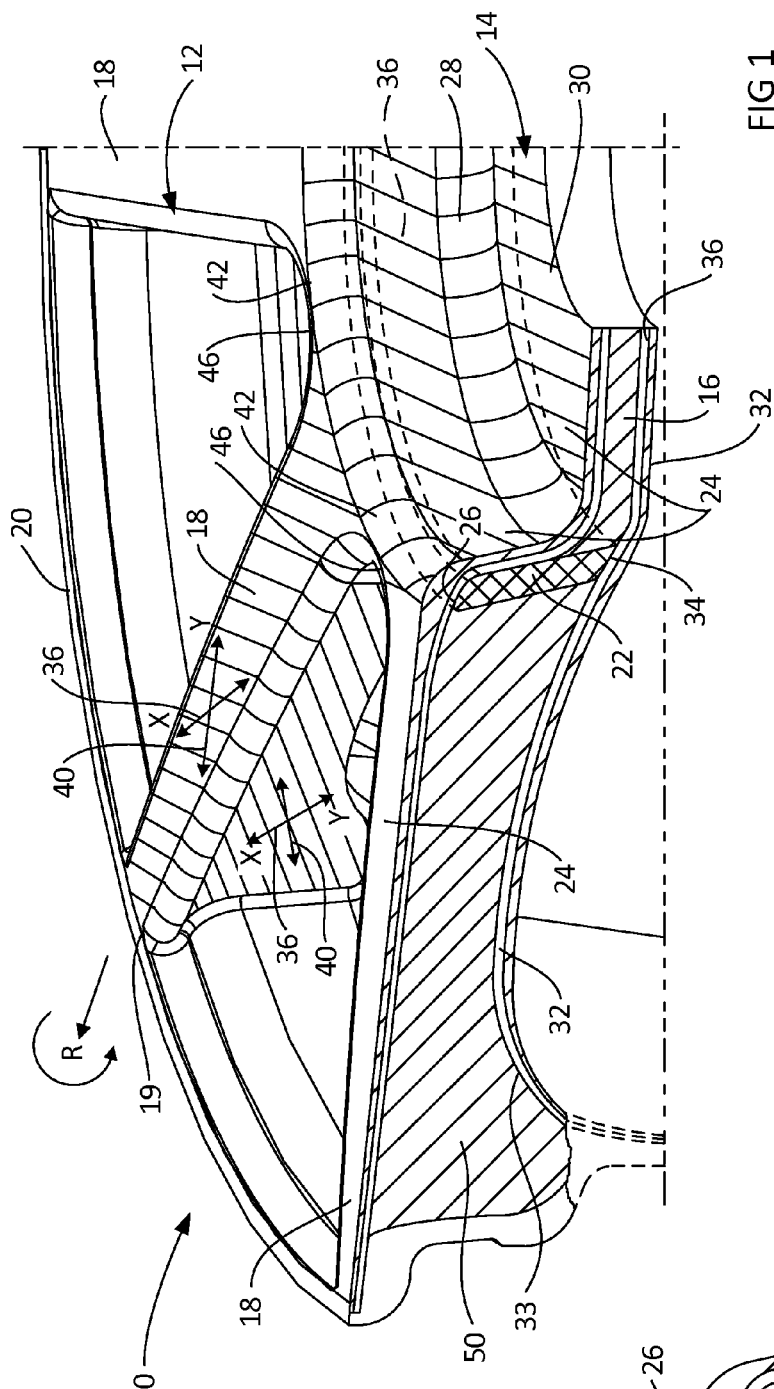
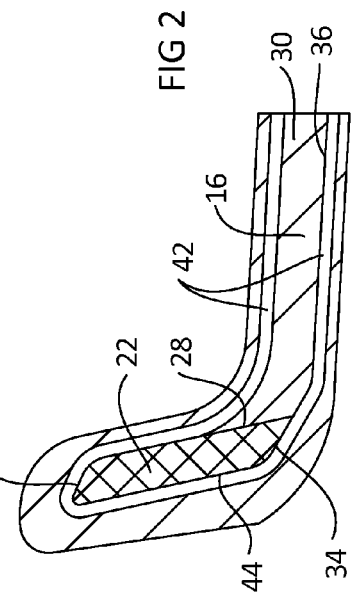

FACE TO HUB CONNECTION FOR A COMPOSITE WHEEL

CROSS REFERENCE TO RELATED APPLICATIONS

This application is the National Stage of International Application No. PCT/AU2013/000646, filed on Jun. 17, 2013, which claims the benefit of Australian Patent Application No. 2012261712, filed on Dec. 10, 2012. The contents of both applications are hereby incorporated by reference in their entirety.

FIELD OF THE INVENTION

The present invention generally relates to composite wheels for vehicles and/or airplanes. More particularly, the invention relates to a connection between the spoke portion and the hub portion of a composite wheel. Accordingly, it will be convenient to hereinafter generally describe the invention in relation to that exemplary application. That said, the invention may be utilized in other applications.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Lateral, vertical and torsional loads transmitted via the tyre to the rim portion of a vehicle wheel result in bending and torsional stresses through the spokes. These stresses must be resolved efficiently at the hub join to provide a mechanically efficient structure that provides stiffness and strength, ideally without adding considerable mass to the wheel.

Existing composite vehicle wheel designs known to the Applicant do not meet these fundamental requirements.

The Applicant is aware of an earlier attempt to produce a composite wheel. However, the Applicant considers the design of that wheel is deficient to the extent that it incorporates metal for connection between the spoke and hub portions of the wheel rather than using a composite material for the connection.

One of the Applicant's previous composite wheel designs included continuous carbon fibre tows running straight across the wheel from spoke to spoke.

Another of their designs used an alternative tow based preform structure, with the wheel configured such that the lug holes were provided between spokes, rather than being more centrally located within the hub. This configuration maintained stiffness from the spoke to the hub because the depth of the spoke was maintained through the hub region of the wheel. In comparison to earlier attempts by others, this arrangement was more structurally efficient, and avoided the need to incorporate joining structures made from a different material (such as metal) using either adhesive or a fastener.

That said, the Applicant's designs referred to above required the tows to be arranged so as to avoid the central hole in the wheel. A central hole is provided for positioning on the vehicle hub. In some circumstances this resulted in the tows being machined to produce the holes, and in all cases the alignment could not be completely straight from one side of the rim to the other. The tows were often severed at the boltholes that were subsequently machined into the wheel hub. All of these issues compromised the efficiency and integrity of the final wheel structure.

Moreover, the tow solution was also difficult to lay into the mould with accuracy and consistency leading to unacceptable process variation.

Destructive testing also identified issues between the tow regions and other regions of the wheel structure that the Applicant considered were due to a mismatch in stiffness. Under high loads cracks were found to form at the interface between very stiff and more compliant regions in the structure.

It would therefore be desirable to provide a composite wheel of improved strength and stiffness in the region where the spokes meet the hub region. Moreover, it would be desirable to do in the absence of adding considerable mass to the wheel.

SUMMARY OF THE INVENTION

According to a broad aspect of the present invention there is provided a connection between a face portion and a hub portion of a composite wheel. The hub portion comprises a generally disc shaped hub plate, and the face portion comprises a plurality of spokes. The connection comprises:
- an annular hub ring surrounding the hub plate, the hub ring comprising a plurality of layers of reinforcement fibres extending in an at least generally circumferential direction about the hub ring;
- a first plurality of layers of reinforcing fibres extending in a generally radial direction relative to an axis of rotation of the wheel, and along a front face of each spoke, across a front edge and an inner annular surface of the hub ring and across a front face of the hub plate;
- a second plurality of layers of reinforcing fibres extending in a generally radial direction along a rear face of each spoke, across a rear edge of the hub ring and across a rear face of the hub plate;
- a third plurality of layers of reinforcing fibres, the third plurality of layers of reinforcing fibres overlaying the first and second layers of reinforcing fibres, the third plurality of layers of reinforcing fibres extending in a direction between +30 degrees and +60 degrees to the radial direction; and
- a fourth plurality of layers of reinforcing fibres, the fourth plurality of layers of reinforcing fibres overlaying the first and second layers of reinforcing fibres, the fourth plurality of layers of reinforcing fibres extending in a direction between −30 degrees and −60 degrees to the radial direction.

In this way, the spokes are joined to the hub plate using the annular hub ring. The hub ring takes into account the difference between the depth of each spoke and the thickness of the hub plate.

The hub ring is important to the invention. Without this component, the torsional and bending loads in the wheel spokes would result in localized distortion of the wheel structure at the root of each spoke where the spoke joins the hub portion. This is due to the rapid change in the structure as the height of the spoke transitions into the hub plate. The ring of fibres in the hub ring provides a rigid structure at the root of each spoke.

In a preferred form, the third plurality of layers of reinforcing fibres extends at about +45 degrees to the radial direction; and the fourth plurality of layers of reinforcing fibres extends at about −45 degrees to the radial direction.

The combined third and fourth plurality of layers of reinforcing fibres is referred to by the Applicant as a "torsion wrap".

A fifth plurality of layers of reinforcing fibres is also most preferably provided, and extends across the rear face of the hub plate, across a rear edge of the hub ring, across an outer annular surface of the hub ring, across the front edge of the hub ring, across the inner annular surface of the hub ring and across the front face of the hub plate, with the third and fourth plurality of layers of reinforcing fibres overlaying the fifth plurality of layers of reinforcing fibres. The fifth plurality of layers of fibres is provided specifically to provide structural reinforcement about the hub portion between the spokes. As such, the fifth plurality of layers of reinforcing fibres preferably extends about the hub ring between a base region of adjacent spokes.

Preferably, each of the first, second, third, fourth and fifth plurality of fibres is composed of carbon fibres.

The fibres may be provided in any suitable form. The fibres for at least one of the plurality of layers preferably comprise fibres provided as one or more prepregs, semi-pregs, woven or non-woven fabrics, mats, pre-forms, pre-consolidated pre-forms, individual or groups of fibres, tows, tow-pregs or a combination thereof. It is envisaged that the hub ring would be manufactured from a uni-directional tow.

Once the fibres are suitably arranged, they are preferably injected and/or impregnated with a matrix and then cured. The connection therefore preferably further comprises a matrix enveloping the first, second, third, fourth and fifth plurality of fibres. Any suitable matrix can be used. The matrix is preferably based on unsaturated polyester, polyurethane, polyvinyl ester, epoxy, thermoplastics, similar chemical compounds or combinations thereof. In a preferred embodiment, the matrix is epoxy-based. In another embodiment, the matrix is a metal matrix composite.

The composite wheel is preferably formed as a unitary body. This typically involves simultaneous injection and/or impregnation of matrix and then curing of each portion of the composite wheel. In such embodiments, each of the hub portion and face portion are preferably at least partially uncured at the time when the connection is prepared. The connection portion is preferably integrally formed with the composite wheel.

Any suitable number of layers may be provided in each of the component parts of the connection.

Several distinct arrangements of the third and fourth plurality of layers of reinforcing fibres are possible. In one arrangement, one or more layers of the third or fourth plurality of layers of reinforcing fibres is interspersed between layers of the other of the third or fourth plurality of layers of reinforcing fibres. In another possible arrangement, the third plurality of layers of reinforcing fibres is provided between the first and fourth plurality of layers of reinforcing fibres. In yet another possible arrangement, the fourth plurality of layers of reinforcing fibres is provided between the first and third plurality of layers of reinforcing fibres.

It is envisaged that, preferably, the first plurality of layers of reinforcing fibres extends radially outwardly along the front face of each spoke to or proximate a front annular edge of a rim portion of the wheel.

Preferably, each of the third and fourth plurality of layers of reinforcing fibres extends about each spoke, across the front edge and the inner annular surface of the hub ring and across the front face of the hub plate, as well across the outer annular surface of the hub ring between the spokes.

It is envisaged that the third and fourth plurality of layers of reinforcing fibres extend outwardly along the front face of each spoke to or proximate a front annular edge of a rim portion of the wheel.

The inner diameter of the hub ring portion is preferably greater than the diameter of the hub plate.

Each of the first, second, third and fourth plurality of layers of reinforcing fibres may be provided in a separate fabric. In such an arrangement, each of the separate fabrics may be stitched together. In another possible arrangement, the first, second, third and fourth plurality of layers of reinforcing fibres may be provided in a single fabric with the first, second, third and fourth plurality of layers of reinforcing fibres being interwoven in the fabric. In yet another possible arrangement, each of the first, second, third and fourth plurality of layers of reinforcing fibres is provided in a tailored fibre preform.

An inner portion of each spoke preferably includes a foam material, which provides support to the spoke during the manufacturing process.

It is envisaged that the hub plate would be manufactured from composite laminate having a thickness of between about 8 mm and about 20 mm. The hub plate may include either a plurality of bolt holes, such as provided on a conventional wheel rim, or a centrally located hole for receiving a centre lock attachment arrangement, such as often used in race cars.

According to another aspect of the present invention, there is provided a method of connecting together a face portion and a hub portion of a composite wheel, wherein the hub portion comprises a generally disc shaped hub plate and the face portion comprises a plurality of spokes. The method comprises providing an annular hub ring surrounding the hub plate, the hub ring comprising a plurality of layers of reinforcement fibres extending in an at least generally circumferential direction about the hub ring. The method also comprises providing a first plurality of layers of reinforcing fibres extending in a generally radial direction relative to an axis of rotation of the wheel, and along a front face of each spoke, across a front edge and an inner annular surface of the hub ring and across a front face of the hub plate. The method further comprises providing a second plurality of layers of reinforcing fibres extending in a generally radial direction along a rear face of each spoke, across a rear edge of the hub ring and across a rear face of the hub plate. Additionally, the method comprises providing a third plurality of layers of reinforcing fibres, the third plurality of layers of reinforcing fibres overlaying the first and second layers of reinforcing fibres, the third plurality of layers of reinforcing fibres extending in a direction between +30 degrees and +60 degrees to the radial direction; and providing a fourth plurality of layers of reinforcing fibres, the fourth plurality of layers of reinforcing fibres overlaying the first and second layers of reinforcing fibres, the fourth plurality of layers of reinforcing fibres extending in a direction between −30 degrees and −60 degrees to the radial direction.

The method may more particularly comprise providing the third plurality of layers of reinforcing fibres extending at about +45 degrees to the radial direction.

Further, the method may more particularly comprise providing the fourth plurality of layers of reinforcing fibres extending at about −45 degrees to the radial direction.

The method also preferably comprises providing a fifth plurality of layers of reinforcing fibres extending across the rear face of the hub plate, across the rear edge of the hub ring, across an outer annular surface of the hub ring, across the front edge of the hub ring, across the inner annular surface of the hub ring and across the front face of the hub plate, with the third and fourth plurality of layers of reinforcing fibres overlaying the fifth plurality of layers of reinforcing fibres.

BRIEF DESCRIPTION OF THE DRAWINGS

It will be convenient to hereinafter describe a preferred embodiment of the invention with reference to the accompanying drawings. The particularity of the drawings is to be understood as not limiting the preceding broad description of the invention.

FIG. 1 is a part-sectional perspective view of a portion of a connection between a face portion and a hub portion of a composite wheel according to one embodiment of the present invention.

FIG. 2 is a sectional magnified side view of a portion of the composite wheel shown in FIG. 1.

DETAILED DESCRIPTION OF THE DRAWINGS

Figure 3:
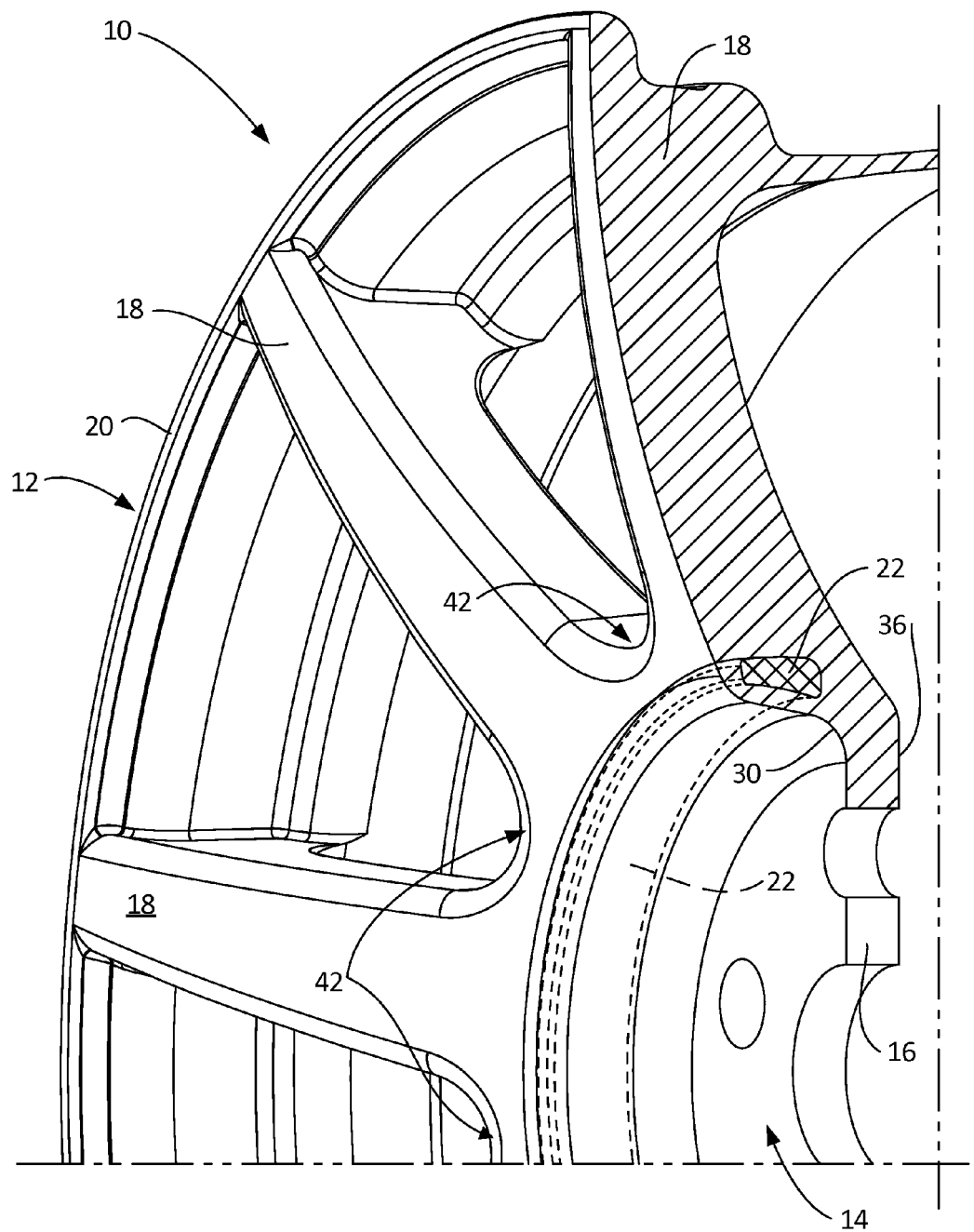
FIG. 3 is another part-sectional perspective view of a portion of the composite wheel shown in FIG. 1.

Referring to the drawings, there is illustrated a composite wheel 10 having a face portion 12 and a hub portion 14. As can be seen, the hub portion 14 comprises a disc shaped hub plate 16.

The hub plate 16 is manufactured from composite laminate having a thickness of between 8 mm and 20 mm. The hub plate 16 may be provided with any suitable bolt pattern, depending on the specific vehicle to which the wheel 10 is to be fitted. Such an arrangement is used on most conventional vehicles. Alternatively, the hub plate 16 may include a centrally located aperture for receiving a centre lock arrangement, as used on race cars.

It can be seen that the face portion 12 is provided with a series of spokes 18 (only some of which are illustrated). The spokes 18 extend generally radially from the hub portion 14 to a rim portion 20.

The wheel 10 is provided with a unique connection between the face portion 12 and the hub portion 14, which provides a desired level of wheel stiffness and strength. The connection is most clearly shown in FIG. 1.

The connection comprises an annular hub ring 22 surrounding the hub plate 16. The hub ring 22 comprises a plurality of layers of reinforcement fibres extending in a generally circumferential direction about the hub ring 22. It is envisaged that the hub ring 22 would be manufactured from a unidirectional tow. The ring 22 is placed into the wheel at an appropriate stage of the lay-up. Desirably, the ring 22 ties the hub ends of all the spokes 18 together in a rigid ring. From FIGS. 1 and 2 it can be seen that the inner diameter of the hub ring 22 is greater than the diameter of the hub plate 16, such that the hub ring 22 is seated about the hub plate 16.

The connection also comprises a first plurality of layers of reinforcing fibres 24 in the form of a spoke strap extending in a generally radial direction R relative to an axis of rotation of the wheel, and along a front face of each spoke 18. It is also to be appreciated that the layers of reinforcing fibres 24 extend across a front edge 26 and an inner annular surface 28 of the hub ring 22, and across the front face 30 of the hub plate 16. As shown in FIG. 1, the layers of reinforcing fibres 24 extend radially outwardly along the front face of each spoke 18 to a front annular edge 19 of the rim portion 20.

The connection further comprises a second plurality of layers of reinforcing fibres 32, also in the form of a spoke strap. The layers of reinforcing fibres 32 extend in a generally radial direction R along a rear face 33 of each spoke 18. The layers of reinforcing fibres 32 also extend across a rear edge 34 of the hub ring 22, and across a rear face 36 of the hub plate 16.

When a wheel on a vehicle is subjected to high lateral loads, during cornering or some other similar event, there is a high, localized force transmitted via the tyre to the rim. This results in a bending force at the spokes adjacent to the lateral load (approximately perpendicular to, and pointing towards, the road surface), and a torsional load at the spokes aligned parallel to the road surface. The spoke strap arrangement provided by the first and second layers 24, 32 addresses the bending loads in individual spokes 18 by providing a structure analogous to an I-beam. The continuous, aligned fibres provided by layers 24, 32 at the top and bottom of the spokes 18 provide optimal stiffness and strength in bending. The fibres 24, 32 are preferably placed as far away from the neutral axis of each spoke 18 as possible to achieve an efficient structure.

A third plurality of layers of reinforcing fibres 36 is also provided, which is in the form of a torsion wrap. The layers of reinforcing fibres 36 overlay the first and second layers of reinforcing fibres 24, 32. The layers of reinforcing fibres 36 extend across the front face of each spoke 18 in a direction X of about +45 degrees to the radial direction R, although this angle may be varied within practical limits if desired. The layers of reinforcing fibres 36 also extend into the hub portion 14. In this regard, the layers of reinforcing fibres 36 extend across the front edge 26 and inner annular surface 28 of the hub ring 22 and across the front face 30 of the hub plate 16.

The connection also comprises a fourth plurality of layers of reinforcing fibres 40, also in the form of a torsion wrap. The layers of fibres 36, 40 may be integrated into a single torsion wrap. The torsion wrap covers the outer surface of each spoke 18. That said, a finishing layer(s) (not shown) may be provided over the torsion wrap.

The layers of reinforcing fibres 40 also overlay the first and second layers of reinforcing fibres 24, 32. The layers of reinforcing fibres 40 extend in a direction Y of about −45 degrees to the radial direction R, although this angle may be varied within practical limits if desired. The layers of reinforcing fibres 40 also extend into the hub portion 14 by extending across the front edge 26 and inner annular surface 28 of the hub ring 22 and across the front face 30 of the hub plate 16.

The torsion wrap provided by layers 36, 40 addresses the torsional loads transmitted through the spokes 18. Fibres aligned at about +45/−45 degrees relative to the axis of rotation will efficiently resist the shear stresses that are generated around the outer surface of each spoke 18. Ideally, the layers 36, 40 are positioned as far away from the axis of rotation as possible to achieve an efficient structure.

Although not clearly shown in the Figures, each of the third and fourth plurality of layers of reinforcing fibres 36, 40 extends about each spoke 18, across the front edge 26 and the inner annular surface 28 of the hub ring 22 and across the front face 30 of the hub plate 16, as well across an outer annular surface 44 of the hub ring between the spokes.

As shown in FIG. 2, a fifth plurality of layers of reinforcing fibres 42 is provided. The layers of reinforcing fibres 42 extend across the rear face 36 of the hub plate 16, across a rear edge 34 of the hub ring 22, across the outer annular surface 44 of the hub ring 22, across the front edge 26 of the hub ring 22, across the inner annular surface 28 of the hub ring 22, and across the front face 30 of the hub plate 16. In other words, the layers of reinforcing fibres 42 extend about the hub ring 22 between a base region 46 of adjacent spokes 18. This additional plurality of layers of fibres 42 is provided specifically to provide structural reinforcement about the hub portion 14 between the spokes 18.

It is to be understood that the third and fourth plurality of layers of reinforcing fibres 36, 40 overlay the fifth plurality of layers of reinforcing fibres 42.

As previously stated, several distinct arrangements of the third and fourth plurality of layers of reinforcing fibres 36, 40 are possible. In one arrangement, one or more layers of the fourth plurality of layers of reinforcing fibres 40 is interspersed between layers of the third plurality of layers of reinforcing fibres 36, or vice versa. In another possible arrangement, the third plurality of layers of reinforcing fibres 36 is provided between the first and fourth plurality of layers of reinforcing fibres 24, 40. In yet another possible arrangement, the fourth plurality of layers of reinforcing fibres 40 is provided between the first and third plurality of layers of reinforcing fibres 24, 36.

It can be seen in FIG. 1, the third and fourth plurality of layers of reinforcing fibres 36, 40 extend outwardly along the front face of each spoke 18 to the front annular edge 19 of the rim portion 20 of the wheel 10.

In the illustrated embodiment, each of the first, second, third, and fourth (and possibly fifth) plurality of layers of reinforcing fibres 24, 32, 36, 40, 42 are provided within a single fabric. This may be achieved by with the first, second, third, fourth and fifth plurality of layers of reinforcing fibres being interwoven in the fabric. As can be appreciated, combining the various fibres within a single fabric may simplify the wheel manufacturing process. Alternatively, one or more of the layers of reinforcing fibres may be provided in a separate fabric. If separate fabrics are provided then it may be that these are stitched or otherwise joined together. In yet another possible arrangement, each of the first, second, third, fourth and fifth plurality of layers of reinforcing fibres is provided in a tailored fibre preform.

It is to be appreciated that FIGS. 1 and 2 show only a single element for each of the layers 24, 32, 36, 40, 42; whereas there would in fact be multiple layers of each element that overlap on the inside and outside of the ring 22. Also other fibres may be aligned throughout the structure (not shown). It is to be noted that the elements should overlap in such a way that the joins between the structural elements are not aligned in one region of the wheel W.

Each spoke 18 includes an inner portion 50 of a foam material. This provides support to the spoke 18 during the manufacturing process. It is to be appreciated that the invention is not intended to be in any way limited to the specific spoke configuration illustrated and described. The invention contemplates application to wheels with any one of a variety of spoke configurations. In this regard, it is to be appreciated that each of the spokes 18 need not be filled with a foam material. The inner cavity of each spoke 18 may instead be empty. Furthermore, each of the spokes 18 may be solid (ie. without a cavity), if desired.

Further, the spokes need not be substantially straight-sided, as shown in the application drawings. The invention is also directed to wheels having spokes with a variety of other configurations, including spokes with curved sides, and wheels having relatively small apertures provided between spokes.

Preferably, each of the first, second, third and fourth plurality of layers is provided as close as practical to the outer surface of the spoke 18. This maximizes the stiffness and strength of the arrangement.

The wheel 10 is desirably lighter, more structurally efficient and avoids the need for joining structures between the hub and spokes made from different materials using either an adhesive or fasteners, when compared to existing known arrangements.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

It is to be understood that various alterations, modifications and/or additions may be introduced into the construction and arrangement of the parts previously described without departing from the spirit or ambit of this invention.

The invention claimed is:

1. A connection between a face portion and a hub portion of a composite wheel,
   the hub portion including a generally disc shaped hub plate and the face portion including a plurality of spokes, the connection comprising:
   an annular hub ring surrounding the hub plate, the hub ring including a plurality of layers of reinforcement fibres extending in an at least generally circumferential direction about the hub ring,
   a first plurality of layers of reinforcing fibres extending in a generally radial direction relative to an axis of rotation of the wheel, and along a front face of each spoke, across a front edge and an inner annular surface of the hub ring, and across a front face of the hub plate;
   a second plurality of layers of reinforcing fibres extending in a generally radial direction along a rear face of each spoke, across a rear edge of the hub ring, and across a rear face of the hub plate;
   a third plurality of layers of reinforcing fibres, the third plurality of layers of reinforcing fibres overlaying the first and second layers of reinforcing fibres, the third plurality of layers of reinforcing fibres extending in a direction between +30 degrees and +60 degrees to the radial direction; and
   a fourth plurality of layers of reinforcing fibres, the fourth plurality of layers of reinforcing fibres overlaying the first and second layers of reinforcing fibres, the fourth plurality of layers of reinforcing fibres extending in a direction between −30 degrees and −60 degrees to the radial direction.

2. The connection between the face portion and the hub portion of the composite wheel according to claim 1, wherein the third plurality of layers of reinforcing fibres extends at about +45 degrees to the radial direction.

3. The connection between the face portion and the hub portion of the composite wheel according to claim 1, wherein the fourth plurality of layers of reinforcing fibres extends at about −45 degrees to the radial direction.

4. The connection between the face portion and the hub portion of the composite wheel according to claim 1, further comprising a fifth plurality of layers of reinforcing fibres extending across the rear face of the hub plate, across the rear edge of the hub ring, across an outer annular surface of the hub ring, across the front edge of the hub ring, across the inner annular surface of the hub ring and across the front face of the hub plate, and with the third and fourth plurality of layers of reinforcing fibres overlaying the fifth plurality of layers of reinforcing fibres.

5. The connection between the face portion and the hub portion of the composite wheel according to claim 4, wherein the fifth plurality of layers of reinforcing fibres extends about the hub ring between a base region of adjacent spokes.

6. The connection between the face portion and the hub portion of the composite wheel according to claim 1, wherein the hub ring is manufactured from a unidirectional tow.

7. The connection between the face portion and the hub portion of the composite wheel according to of claim 6, wherein the third plurality of layers of reinforcing fibres is provided between the first and fourth plurality of layers of reinforcing fibres.

8. The connection between the face portion and the hub portion of the composite wheel according to claim 6, wherein the fourth plurality of layers of reinforcing fibres is provided between the first and third plurality of layers of reinforcing fibres.

9. The connection between the face portion and the hub portion of the composite wheel according to claim 1, wherein one or more layers of the third or fourth plurality of layers of reinforcing fibres is interspersed between layers of the other of the third and fourth plurality of layers of reinforcing fibres.

10. The connection between the face portion and the hub portion of the composite wheel according to claim 1, wherein the first plurality of layers of reinforcing fibres extends radially outwardly along the front face of each spoke to or proximate a front annular edge of a rim portion of the wheel.

11. The connection between the face portion and the hub portion of a composite wheel according to claim 1, wherein each of the third and fourth plurality of layers of reinforcing fibres extends about each spoke, across the front edge and the inner annular surface of the hub ring, across the front face of the hub plate, and across the outer annular surface of the hub ring between the spokes.

12. The connection between the face portion and the hub portion of the composite wheel according to claim 1, wherein the third and fourth plurality of layers of reinforcing fibres extend outwardly along the front face of each spoke to or proximate a front annular edge of a rim portion of the wheel.

13. The connection between the face portion and the hub portion of the composite wheel according to claim 1, wherein an inner diameter of the hub ring portion is greater than a diameter of the hub plate.

14. The connection between the face portion and the hub portion of the composite wheel according to claim 1, wherein each of the first, second, third and fourth plurality of layers of reinforcing fibres is provided in a separate fabric.

15. The connection between the face portion and the hub portion of the composite wheel according to claim 14, wherein each of the separate fabrics is stitched together.

16. The connection between the face portion and the hub portion of the composite wheel according to claim 1, wherein the first, second, third and fourth plurality of layers of reinforcing fibres are provided in a single fabric with the first, second, third and fourth plurality of layers of reinforcing fibres interwoven in the fabric.

17. The connection between the face portion and the hub portion of the composite wheel according to claim 1, wherein each of the first, second, third and fourth plurality of layers of reinforcing fibres is provided in a tailored fibre preform.

18. The connection between the face portion and the hub portion of the composite wheel according to claim 1, wherein an inner portion of each spoke includes a foam material.

19. The connection between the face portion and the hub portion of the composite wheel according to claim 1, wherein the hub plate is manufactured from composite laminate having a thickness of between about 8 mm and about 20 mm, the hub plate including either a plurality of bolt holes or a centrally located hole for receiving a centre lock attachment arrangement.

20. The method of connecting together a face portion and a hub portion of a composite wheel, wherein the hub portion includes a generally disc shaped hub plate and the face portion includes a plurality of spokes, the method comprising:
   providing an annular hub ring portion surrounding the hub plate, the hub ring includes a plurality of layers of reinforcement fibres extending in an at least generally circumferential direction about the hub ring,
   providing a first plurality of layers of reinforcing fibres extending in a generally radial direction relative to an axis of rotation of the wheel, and along a front face of each spoke, across a front edge and an inner annular surface of the hub ring, and across a front face of the hub plate;
   providing a second plurality of layers of reinforcing fibres extending in a generally radial direction along a rear face of each spoke, across a rear edge of the hub ring, and across a rear face of the hub plate;
   providing a third plurality of layers of reinforcing fibres, the third plurality of layers of reinforcing fibres overlaying the first and second layers of reinforcing fibres, the third plurality of layers of reinforcing fibres extending in a direction between +30 degrees and +60 degrees to the radial direction; and
   providing a fourth plurality of layers of reinforcing fibres, the fourth plurality of layers of reinforcing fibres overlaying the first and second layers of reinforcing fibres, the fourth plurality of layers of reinforcing fibres extending in a direction approximately −30 degrees and −60 degrees to the radial direction.

21. The method according to claim 20, and further comprising the third plurality of layers of reinforcing fibres extending at about +45 degrees to the radial direction.

22. The method according to claim 20, and further comprising the fourth plurality of layers of reinforcing fibres extending at about −45 degrees to the radial direction.

23. The method according to claim 20, and further comprising a fifth plurality of layers of reinforcing fibres extending across the rear face of the hub plate, across a rear edge of the hub ring, across an outer annular surface of the hub ring, across the front edge of the hub ring, across the inner annular surface of the hub ring and across the front face of the hub plate, and with the third and fourth plurality of layers of reinforcing fibres overlaying the fifth plurality of layers of reinforcing fibres.

\* \* \* \* \*

UNITED STATES PATENT AND TRADEMARK OFFICE
CERTIFICATE OF CORRECTION

PATENT NO. : 9,662,932 B2
APPLICATION NO. : 14/650779
DATED : May 30, 2017
INVENTOR(S) : Matthew Edward Dingle et al.

It is certified that error appears in the above-identified patent and that said Letters Patent is hereby corrected as shown below:

In the Claims

Claim 7, Column 9, Line 9:
Delete "portion of the composite wheel according to of claim 6,"
Insert --portion of the composite wheel according to claim 6,--

Claim 20, Column 10, Line 16:
Delete "20. The method of connecting together a face portion and"
Insert --20. A method of connecting together a face portion and--

Signed and Sealed this
Twentieth Day of February, 2018

Andrei Iancu
*Director of the United States Patent and Trademark Office*